United States Patent
Harvey

(10) Patent No.: US 7,354,243 B2
(45) Date of Patent: Apr. 8, 2008

(54) AXIAL COMPRESSOR BLADING

(75) Inventor: Neil W. Harvey, Derby (GB)

(73) Assignee: Rolls-Royce, PLC, London (GB)

( * ) Notice: Subject to any disclaimer, the term of this patent is extended or adjusted under 35 U.S.C. 154(b) by 0 days.

(21) Appl. No.: 11/504,697

(22) Filed: Aug. 16, 2006

(65) Prior Publication Data
US 2007/0059177 A1 Mar. 15, 2007

(30) Foreign Application Priority Data
Sep. 13, 2005 (GB) .................................. 0518628.3

(51) Int. Cl.
*F01D 9/02* (2006.01)
*F01D 5/14* (2006.01)
(52) U.S. Cl. .................... 415/191; 415/211.2; 415/914; 416/193 A
(58) Field of Classification Search ................ 415/191, 415/211.2, 914; 416/193 A
See application file for complete search history.

(56) References Cited

U.S. PATENT DOCUMENTS

| | | | |
|---|---|---|---|
| 2,918,254 A | 12/1959 | Hausammann | |
| 6,283,713 B1 | 9/2001 | Harvey et al. | |
| 6,561,761 B1* | 5/2003 | Decker et al. | ........... 415/173.1 |
| 7,134,842 B2* | 11/2006 | Tam et al. | .............. 416/193 A |
| 7,220,100 B2* | 5/2007 | Lee et al. | .................... 415/191 |
| 2004/0013520 A1 | 1/2004 | Guemmer | |

FOREIGN PATENT DOCUMENTS

GB 2 388 162 A 11/2003

* cited by examiner

*Primary Examiner*—Ninh H. Nguyen
(74) *Attorney, Agent, or Firm*—Oliff & Berridge, PLC

(57) ABSTRACT

An axial compressor has at least one circumferential row of aerofoil members (30a, 30b, 30c) in which at least one of the two end walls (37) between adjacent blades is given a non-axisymmetric profile, defined by circumferentially-extending sinusoids at a number of axial positions (AA, BB, CC). Corresponding points on the successive sinusoids are joined by spline curves, so that the curvature of the end wall is smooth. This end-wall profiling modifies the boundary layer flow at the wall, reducing or eliminating the corner separation and reversed flow associated with known arrangements.

12 Claims, 5 Drawing Sheets

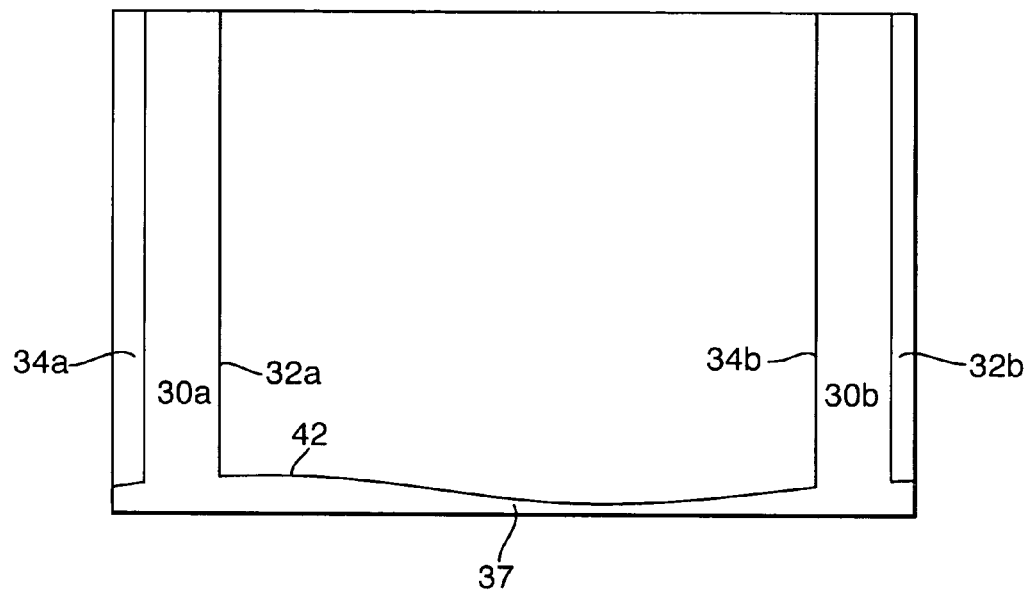
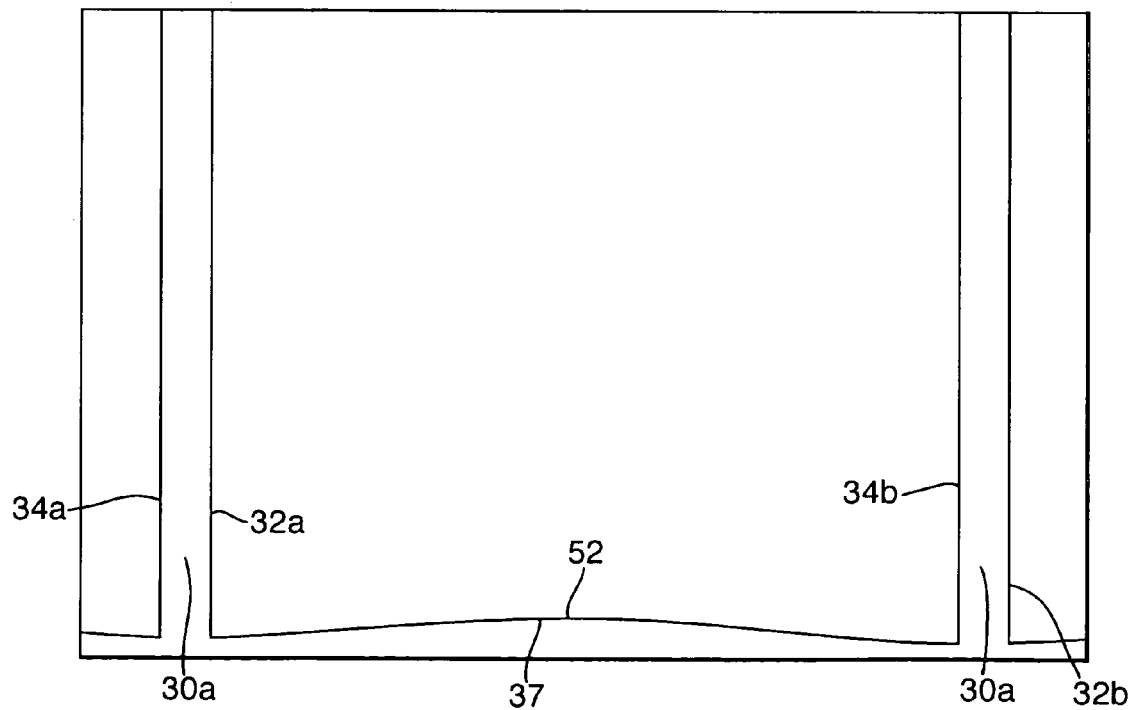

AXIAL COMPRESSOR BLADING

This invention relates to turbomachinery in which there are one or more rows of generally radially extending aerofoil members in an annular duct through which a fluid flows. The invention is particularly concerned with improving the control of the fluid flow past rows of such aerofoil members, which may be fixed vanes or may be blades rotating about the central axis of the duct.

The purpose of this invention is to reduce losses, and thereby improve aerodynamic efficiency, in axial flow compressor blading. In particular it is aimed at reducing "corner separation" and its adverse effects.

All aerofoils, whether in compressors or in turbines, use surface curvature to change the static pressure of the flow and thus provide lift. All such blade rows suffer from secondary flows that arise on the end walls and produce losses.

Friction on the annular walls of the blade passages creates a boundary layer of slower moving air. As this air passes between the aerofoils it is more strongly influenced by the pressure gradient between the lower and upper surfaces of adjacent blades, whereas the faster air outside the boundary layer is in equilibrium with the pressure gradient and is turned to the design exit flow angle. The slow boundary layer airflow is over-turned (that is, turned further than the design angle) and rolls up into vortices, creating secondary flows that result in aerodynamic losses. (See, for example, Takeishi et al. (1989, "An Experimental Study of the Heat Transfer and Film Cooling on Low Aspect Ratio Turbine Nozzles", ASME Paper 89-GT-187).)

In compressors, the problems associated with these secondary flows are exacerbated because generally compressor blade rows diffuse the flow. Because of this, typically the over-turned boundary layer will not simply roll up into a vortex, but additionally a region of separated flow will form in the corner between the aerofoil suction surface and the end wall. In parts of this separated region, the airflow may be reversed.

This corner separation is a source of significant losses, typically larger than the losses arising from "standard" secondary flows (such as in turbines). Corner separation may also cause significant blockage of the flow, reducing the mass flow delivered by the compressor. Furthermore, the presence of the secondary flow and corner separation causes the flow angle at exit from the row to deviate from the design angle. Consequently, the incidence angle of the flow onto the next blade row deviates from its design angle, reducing that row's aerodynamic efficiency.

As the pressure rise demanded of a compressor increases it moves up its "characteristic". The aerofoils experience positive incidence and increased aerodynamic loading. Under these conditions the corner separation rapidly increases and may result in stalling of the blade row. This behaviour may ultimately define the surge margin of the machine.

A known means of controlling corner separation, now widely used throughout the gas turbine industry, is by three-dimensional leaning of the aerofoils. The application of "sweep" and "dihedral" leans (parallel and normal to the aerofoil chord line, respectively) can reduce the separation and flow reversal seen near to the end walls, and this improves the design point efficiency, compressor pressure ratio and surge margin of compressors. However, there are drawbacks.

Firstly, the scope for leaning the aerofoils (particularly those in rotating blade rows) may be limited by mechanical constraints, especially stress. Even in stationary components (stators and vanes) where stress is not so important, manufacturing constraints may limit the three-dimensional shaping.

Secondly, both sweep and dihedral (especially the former) incorporate axial lean components. If the axial lean is not the same for adjacent blade rows (e.g. one is curved and the neighbouring one is radial) this will add to the length of a multi-stage machine. This may result in weight and efficiency penalties.

Thirdly, if the aerodynamic loading of the compressor and its blade rows is high enough, even the optimum leant aerofoil shape may not be enough to eliminate the corner separation. As the aerodynamic demands on turbomachine components continue to increase, this situation is likely to arise ever more frequently.

U.S. Pat. No. 6,283,713 of Rolls-Royce discloses sinusoidally shaped, axially located cross-sections which when applied to the end wall of a turbomachinery blade row create "humps" and "hollows" in the surface aligned in the axial direction. The flow over the convex curvature (of the humps) experiences relative acceleration and the static pressure falls locally. Conversely the flow over the concave curvature (of the hollows) experiences relative diffusion and the static pressure rises locally. By applying these humps and hollows the static pressure distribution on the end wall is modified in order to control the secondary flow. The patent discloses two different forms of the end-wall profiling.

In the first, a hump near the aerofoil pressure side lowers the static pressure there and a corresponding hollow near the adjacent suction side raises the static pressure locally. The hump and hollow are axially located in the early to mid part of the passage. The result is a reduction in the cross-passage pressure gradient that drives the over-turning of the inlet boundary layer, and a corresponding reduction in the secondary flow and loss.

In the second, a similar hump and hollow are arranged axially in the later part of the passage, with the hump near the suction surface and the hollow near the pressure surface. This increases the cross-passage pressure gradient towards the rear of the aerofoil. The purpose of this is to set up, or to enhance, a counter-vortex which helps reduce the flow angle deviations caused by the secondary flow. It has the drawback that the extra vortex adds to the losses in the flow.

It is therefore an object of this invention to improve the aerodynamic efficiency of axial flow compressor blading, by reducing or eliminating corner separation and its effects, without the drawbacks associated with known arrangements.

According to the invention, a row of aerofoil members for an axial compressor comprises a plurality of radially extending aerofoils and further comprises circumferentially extending radially inner and outer end walls, in which at least one of the end walls has a profile defined by a plurality of perturbations at a succession of axial positions, at least one of the perturbations being a sinusoid, the or each sinusoid being defined by its phase and its amplitude relative to the baseline profile of the or each end wall, the pitch of the or each sinusoid being the same as the pitch of the aerofoil members, the or each end wall being further shaped to provide smooth transitions between successive perturbations.

At least one sinusoidal perturbation may additionally be defined by a constant displacement relative to the baseline profile of the or each end wall.

A concave region may be provided in at least one end wall upstream of the perturbations in that end wall.

Preferably, the further shaping of the or each end wall is achieved by fitting a plurality of spline curves between points on successive perturbations in a streamwise direction.

The amplitude of each sinusoidal perturbation may be less than 10% of the true chord length of the aerofoil members. Preferably, the amplitude of each sinusoidal perturbation is between 1% and 6% of the true chord length of the aerofoil members.

At least one of the profiled end walls may be formed by surfaces of platforms that are integral with the members of the row.

The members may project from a rotary hub and may be provided with an outer circumferential shroud rotatable with the members and forming an outer end wall, and at least the outer end wall may be profiled.

Both the inner and the outer radial end walls may be profiled.

The profile may extend beyond at least one of the leading and trailing edges of the members.

An aerofoil member for a row according to the invention may have an integral portion extending transversely to the pressure and suction surfaces at least at one radial end of the member to form at least a portion of an end wall.

The invention will now be further described by way of example, with reference to the accompanying drawings, in which FIG. 1 shows a simulation of flow in an aerofoil row of known type;

FIGS. 3 and 4 show axial cross-sections of FIG. 2, respectively at positions AA and CC;

Figure 1:
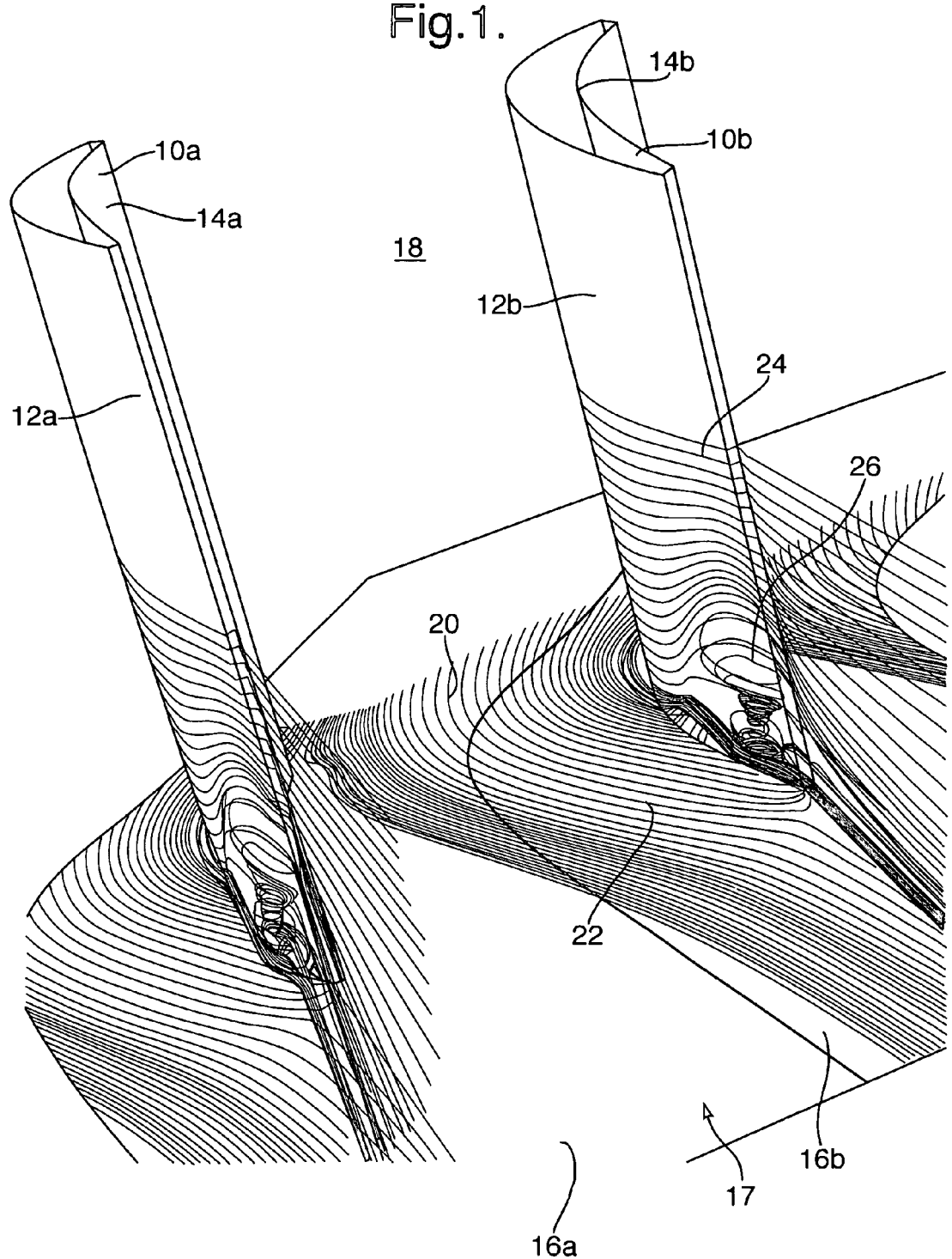

FIG. 1 shows the results from a Computational Fluid Dynamics (CFD) simulation of the flow in a simple linear cascade of compressor blade rows. Two adjacent aerofoils (10a, 10b) are shown, each having a suction surface (respectively 12a, 12b) and a pressure surface (14a, 14b). A platform (16a, 16b) is associated with each aerofoil (10a, 10b), the platforms (16a, 16b) being radially inward of the aerofoils and together defining an end wall 17. A flow passage (18) is defined by the surfaces 14a, 17 and 12b and by a shroud surface (not shown) radially outward of the aerofoils (10a, 10b). The model is viewed from the rear (from downstream looking upstream). Streaklines show the flow patterns on the end wall (17) and on the aerofoil suction surface (12b) for the lower half of the passage). The inlet main stream flow (20) is at the design incidence and velocity.

The over-turning of the fluid at the bottom of the inlet boundary layer is visible in the streaklines (22); this causes the airflow to impinge onto the suction surface (12b) of the aerofoil. On the aerofoil, near mid-height, the flow lines are two-dimensional (24). However, nearer the end wall (17) the streaklines on the aerofoil are highly three-dimensional and clearly indicate the region of separated flow (26) (where some reverse flow can be seen).

Figure 2:
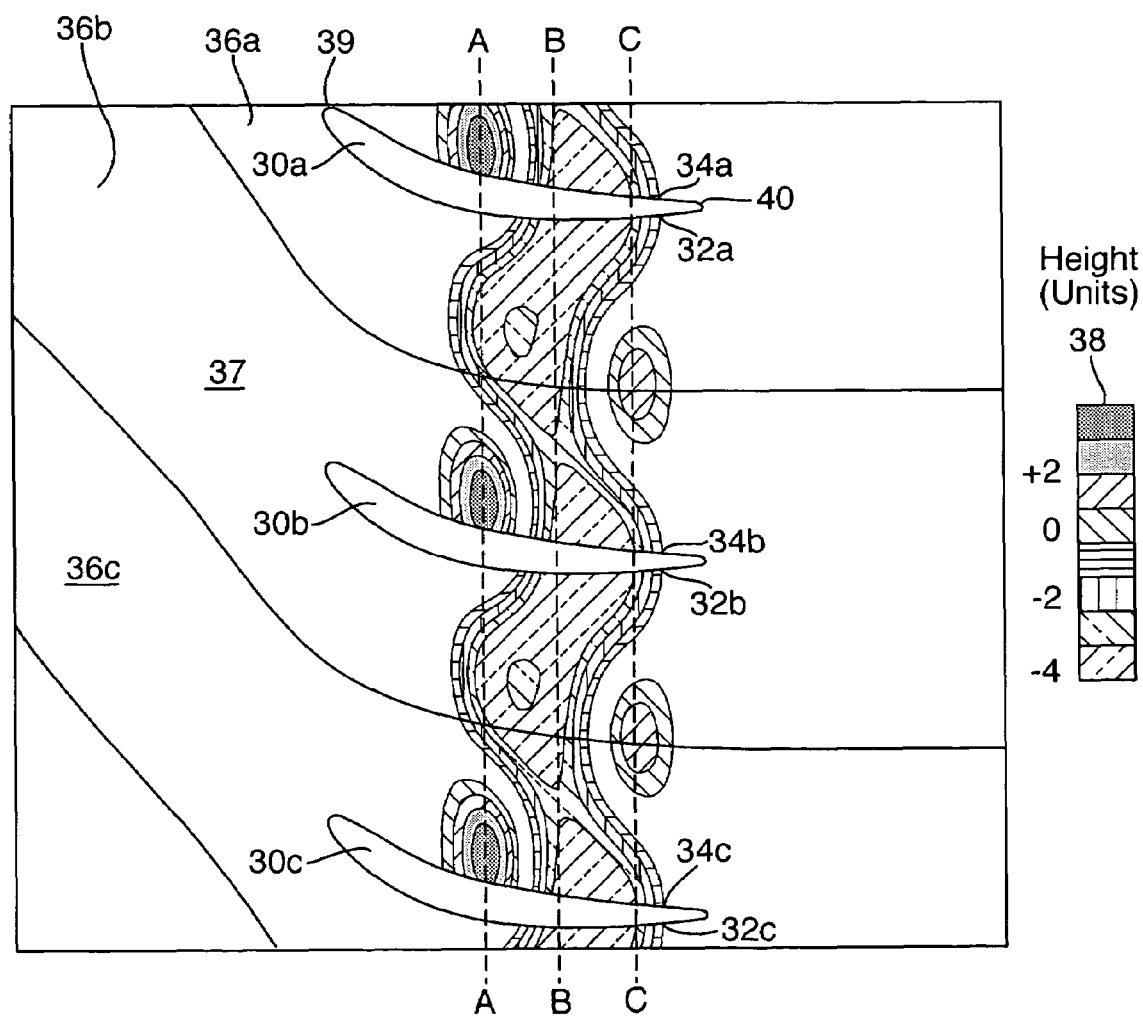
FIG. 2 shows a plan view of part of a blade row according to the invention.

FIG. 2 shows a plan view of part of a blade row according to the invention. Three aerofoils (30a, 30b, 30c) are shown, each having a suction surface (32a, 32b, 32c) and a pressure surface (34a, 34b, 34c). A platform (36a, 36b, 36c) is associated with each aerofoil (30a, 30b, 30c). These platforms (36a, 36b, 36c) together define an end wall (37) of the blade row. The rotational axis of the blade row lies horizontally (from left to right across this figure) but is not shown. References to axial direction or axial position refer to this axis. The upstream direction is to the left of the figure, and the downstream direction to the right. In use, therefore, gas flows from left to right. Each aerofoil has a leading edge (39) and a trailing edge (40). The distance between the leading (39) and trailing (40) edges, in the axial direction, is referred to as the axial chord length.

The shading of the end wall (37) regions (in accordance with the height scale (38)) indicates displacement into (negative) or out of (positive) the paper. A height of zero indicates an end wall position equivalent to that in a known blade row (such as that shown in FIG. 1), in which there is no deviation in the shape of the end wall. References in this specification to a baseline profile refer to a notional end wall whose height is zero at all points.

At three successive axial positions AA, BB, CC on the aerofoil end wall, displacements or sinusoidal perturbations (relative to the baseline profile) are applied to the axial cross section. The sinusoids have the same pitch as the aerofoil, which means that they can also be applied outside the blade passage without any discontinuities in surface curvature in the circumferential direction.

At position AA (about 40% axial chord length) a sinusoid of amplitude 3 height units has been specified with a phase such that there is a peak (42) near the aerofoil pressure surface. FIG. 3 shows an axial cross-section of FIG. 2 at AA. In this figure, the axial direction is normal to the paper.

At BB (about 60% of axial chord length) a displacement of about −3 units into the end wall has been specified. (If this were to be applied alone, it would form a local trough, running circumferentially, in the end wall.)

At CC (about 80% of axial chord length) another sinusoid has been specified, this time of 2 height units and at a phase such that the peak (52) is mid-way between the aerofoils. FIG. 4 shows an axial cross-section of FIG. 2 at CC. In this figure, the axial direction is normal to the paper.

It will be observed that the amplitude and phase of the sinusoids at positions AA and CC are different.

Spline curves are fitted through corresponding points in the three axially defined profiles, to give a smooth variation in surface curvature in the idealised streamwise direction.

The result is a complex variation of surface curvature in the axial direction. The locally convex and concave curvatures respectively lower and raise the static pressure in the same way described in the introduction, but by defining the curvature at several positions in the blade passage, better control is achieved over the airflow than in known arrangements.

Figure 5:
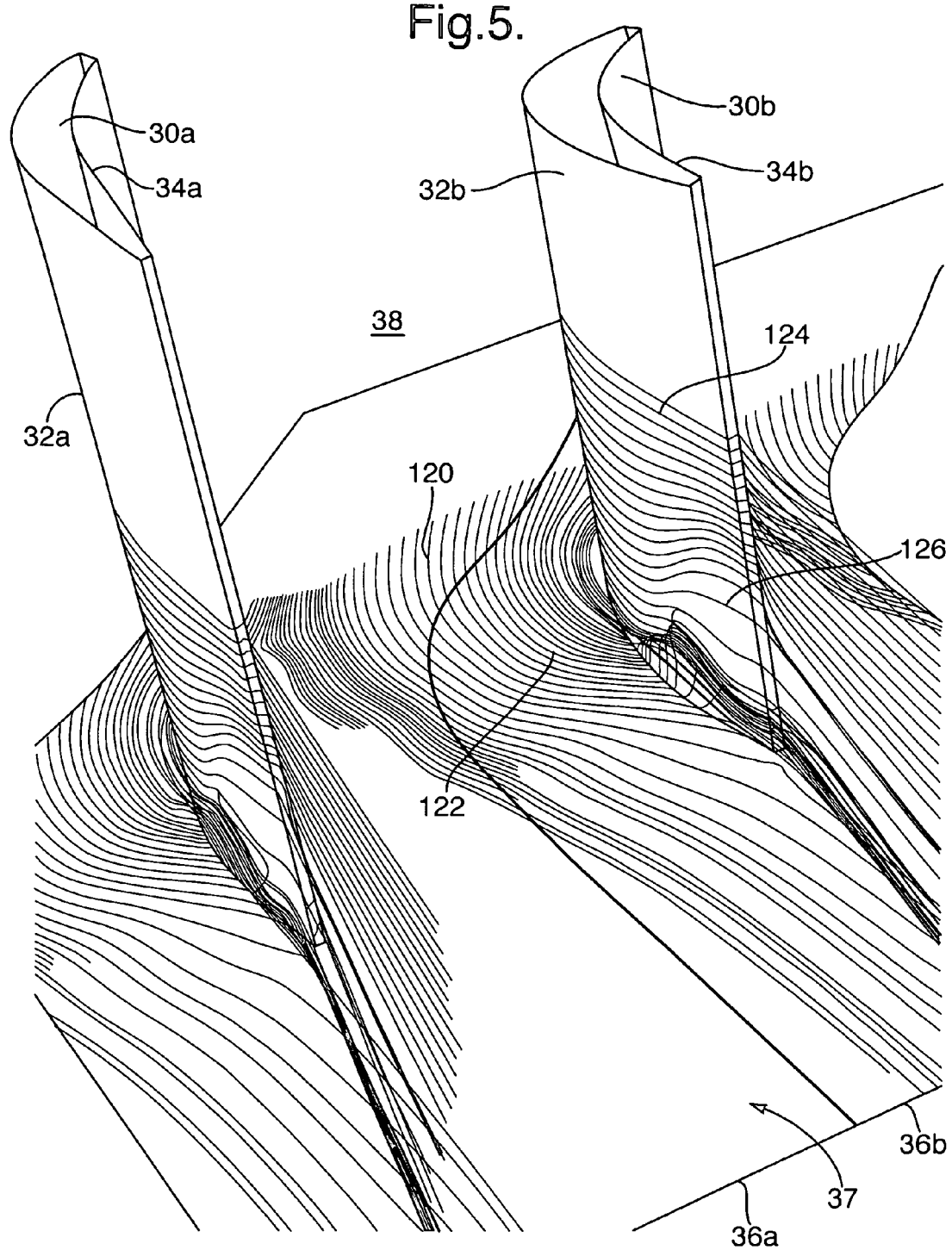
FIG. 5 shows a simulation of flow in an aerofoil row according to the invention.

This is illustrated in FIG. 5, which shows the results from a Computational Fluid Dynamics (CFD) simulation of the flow in a blade row according to the embodiment of the invention described above. As in FIG. 1, two adjacent aerofoils (30a, 30b) are shown, each having a suction surface (respectively 32a, 32b) and a pressure surface (34a, 34b). A platform (36a, 36b) is associated with each aerofoil (30a, 30b), the platforms (36a, 36b) being radially inward of the aerofoils and together defining an end wall 37. A flow passage (38) is defined by the surfaces 34a, 37 and 32b and by a shroud surface (not shown) radially outward of the aerofoils (30a, 30b).

The inlet main stream flow (120) is at the design incidence and velocity.

The over-turning of the fluid at the bottom of the inlet boundary layer is again visible in the streaklines (122). On the aerofoil, near mid-height, the flow lines are two-dimensional (124) as in FIG. 1. However, nearer the end wall (37)

the streaklines on the aerofoil (26) show that the shaping of the end-wall (37) has greatly reduced the corner separation, and eliminated the reversed flow seen in FIG. 1.

Figure 6:
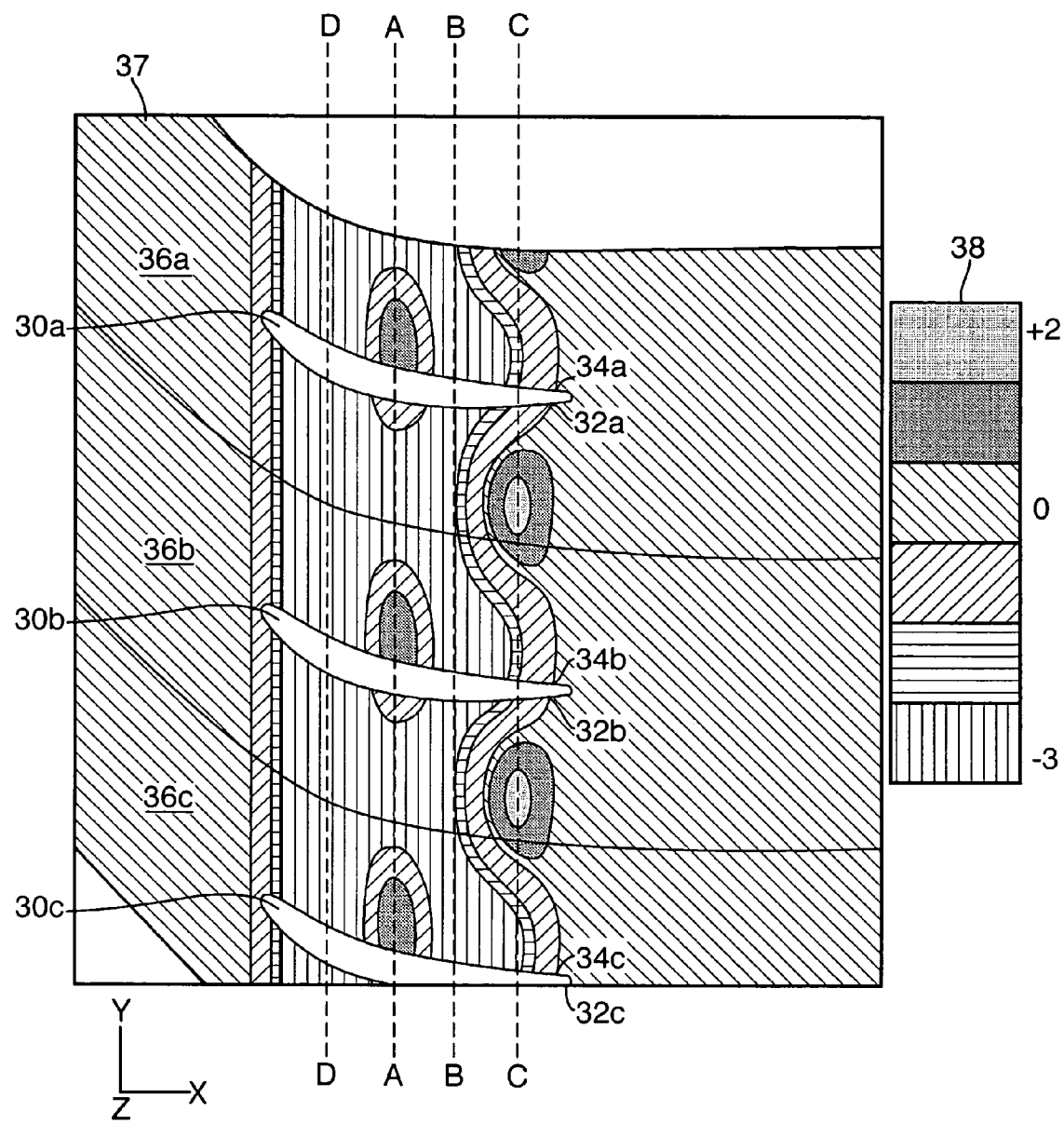
FIG. 6 shows a plan view of an alternative embodiment of the invention.

An alternative embodiment of the invention is shown in FIG. 6. Several elements are the same as those shown in FIG. 2, and are indicated by the same reference numbers.

At position DD in FIG. 6 (about 20% axial chord length) a displacement of amplitude −3 height units has been specified. This provides a concave region early in the blade passages, locally increasing the flow area. It is known to apply such a displacement by itself, but it has been found that in combination with the perturbations as shown in FIG. 2, it results in a further unexpected improvement in the performance of the blade row.

Of course, a number of modifications may be made to the embodiments described above, without departing from the scope of the invention.

The profile of the end wall may be defined at any convenient number of axial positions.

If more than one sinusoid is employed, their amplitude and phase may be different at each plane, or may be the same.

At one or more axial positions a constant displacement, either positive or negative, of the end wall relative to the baseline profile may be specified. Such a constant displacement may be applied instead of, or in addition to, a sinusoidal displacement.

Perturbations may be applied to either the radially inner or the radially outer end wall in the blade row, or to both.

The optimum amplitudes of the perturbations will vary depending on the details of the aerodynamic duty of the blade row concerned, such as: inlet and exit flow angles and Mach number; aerofoil lift coefficient; inlet boundary layer profile. However they will typically lie in the range 2-6% of blade chord. For high Mach number flows (transonic and above) amplitudes may be as low as 1% of chord. For low velocities amplitudes of up to 10% of chord may be useful.

The invention thus provides a significant improvement in compressor performance, by reducing or eliminating corner separation and flow reversal, without the disadvantages associated with known methods of controlling corner separation.

I claim:

1. A row of aerofoil members for an axial compressor, the row comprising:
    a plurality of radially extending aerofoils; and
    circumferentially extending radially inner and outer end walls,
    wherein at least one of the end walls has a profile defined by a plurality of perturbations at a succession of axial positions,
    wherein at least a first terturbation is not in phase with a second perturbation,
    wherein at least one of the perturbations is a sinusoid, the or each sinusoid being defined by its phase and its amplitude relative to the baseline profile of the or each end wall, the pitch of the or each sinusoid being the same as the pitch of the aerofoil members, the or each end wall being further shaped to provide smooth transitions between successive perturbations.

2. The row of aerofoil members as in claim 1, wherein the at least one sinusoidal perturbation is additionally defined by a constant displacement relative to the baseline profile of the or each end wall.

3. The row of aerofoil members as in claim 1, wherein a concave region is provided in at least one end wall upstream of the perturbations in that end wall.

4. The row of aerofoil members as in claim 1, wherein the further shaping of the or each end wall is achieved by fitting a plurality of spline curves between points on successive perturbations in a streamwise direction.

5. The row of aerofoil members as in claim 1, wherein the amplitude of each sinusoidal perturbation is less than 10% of the true chord length of the aerofoil members.

6. The row of aerofoil members as in claim 1, wherein the amplitude of each sinusoidal perturbation is between 1% and 6% of the true chord length of the aerofoil members.

7. The row of aerofoil members as in claim 1, wherein at least one of the profiled end walls is formed by surfaces of platforms that are integral with the members of the row.

8. The row of aerofoil members as in claim 1, wherein the members project from a rotary hub and are provided with an outer circumferential shroud rotatable with the members and forming an outer end wall, and in which at least the outer end wall is profiled.

9. The row of aerofoil members as in claim 1, wherein both the inner and the outer radial end walls are profiled.

10. The row of aerofoil members according to claim 1, wherein the profile extends beyond at least one of the leading and trailing edges of the members.

11. The row of aerofoil members as in claim 1, wherein the member has an integral portion extending transversely to the pressure and suction surfaces at least at one radial end of the member to form at least a portion of an end wall.

12. A row of aerofoil members for an axial compressor, the row comprising:
    a plurality of radially extending aerofoils; and
    circumferentially extending radially inner and outer end walls,
    wherein at least one of the end walls has a profile defined by a plurality of perturbations at a succession of axial positions, at least one of the perturbations being a sinusoid, the or each sinusoid being defined by its phase and its amplitude relative to the baseline profile of the or each end wall, the pitch of the or each sinusoid being the same as the pitch of the aerofoil members, the or each end wall being further shaped to provide smooth transitions between successive perturbations, and
    wherein a concave region is provided in at least one end wall upstream of the perturbations in that end wall.

* * * * *